Patented Jan. 2, 1951

2,536,176

UNITED STATES PATENT OFFICE 2,536,176

PROCESS FOR PRESERVING FRUIT

Lloyd J. Harriss, Chicago, Ill.

No Drawing. Application March 26, 1947,
Serial No. 737,407

4 Claims. (Cl. 99—193)

This invention relates in general to the preservation of fruits and the like by freezing, and is particularly directed to the preserving of apples.

One of the principal objects of the present invention is to provide a preserving or freezing process for fruit and the like wherein the fruit is first prepared by slicing in a particular manner, and the maximum thickness of each slice is controlled.

Another and more specific object is to provide a process for preserving apples, or other fruit having a similar density and porosity, wherein the fruit is cut into slices of a predetermined thickness and then frozen after adding ascorbic acid or other similar preservative thereto.

Still another object is to provide a process for preserving apples wherein the apples are first cut into slices in a predetermined manner, where each slice has a predetermined maximum thickness, after which ascorbic acid is added and the mixture is then frozen.

Other objects of the invention will become apparent upon a reading of the following description.

In the preserving of fruits by freezing, it has become a common expedient to add certain amounts of a preservative, such as ascorbic acid, to the fruit. Practically all fruits contain a natural amount of ascorbic acid, but usually in insufficient amounts to preserve the fruit after exposure to the air for any length of time. Additional ascorbic acid has been added to such fruits in either a powdered or liquid form to bring the total acid content up to the amount necessary to effect preserving.

A particular problem has arisen with respect to apples. It is a matter of common knowledge that apples will turn brown after exposure to the air for even short periods of time. In the normal freezing process, the apples are sliced into segments and mixed with a predetermined amount of ascorbic acid and then frozen.

It has long been a recognized problem, however with respect to the freezing of apples that they will inevitably turn brown regardless of the amount of ascorbic acid which had been added thereto. Up to the present time, no satisfactory solution to this problem has become evident.

Apples, like other fruit, contain a certain amount of ascorbic acid, although the amount contained therein will vary not only with respect to the type of apple, but also with respect to the seasons of the year. For example, apples will contain less natural ascorbic acid during the winter and spring of the year than they will during the fall. For this reason, in the freezing process, it is necessary to add more ascorbic acid during the winter and spring months than during the fall of the year to bring the total ascorbic acid content up to the predetermined desired amount necessary for preserving and to prevent browning.

Comparative large scale freezing of sliced apples under ordinary conditions may call for ascorbic acid in a solid or powdered form in the amount of approximately 2 teaspoons to about 30 pounds of apples. This amount of acid, of course, may be varied with respect to the type of apple and the season of the year.

The process disclosed herein, which is particularly directed to solving the problem in the freezing of apples to prevent them from turning brown, lies generally in the thickness of the slices used and particularly in the shape of the slices. I have determined that the nature of apples with respect to their density and porosity is such that they will absorb only a relatively small amount of ascorbic acid, and then only to a certain depth which is insufficient for a complete preserving of the fruit to prevent it from turning brown. I have also determined that if the thickness of the apple slices at its maximum width is greater than approximately three-eighths of an inch, then the ascorbic acid as a preservative will not prevent the apple slices from turning brown. This is true regardless of the amount of ascorbic acid used. When the thickness of the slices, however, has been reduced to about three-eighths of an inch or less, then the ascorbic acid will penetrate sufficiently to prevent browning.

In actual practice it has been determined that for best results the apple is first cut into segments which may, for convenience, be thirds or quarters, for example, and then each segment is transversely sliced so that the maximum thickness thereof does not exceed about three-eighths of an inch. Perhaps a lesser thickness of about one-quarter of an inch might be better, although a thickness up to about one-half of an inch has been found to be less satisfactory. With the apples sliced in this manner, where each slice does not exceed about three-eighths of an inch in thickness, about 30 pounds may be placed in a container to which has been added approximately two teaspoons of ascorbic acid in solid form. The acid is then thoroughly mixed with the apples and the mixture is frozen. With slices of this nature and size, it has been determined that the apples do not turn brown, thus overcoming one of the more puzzling problems which has confronted the frozen fruit industry with respect to apples.

Although other fruits may not have the outward appearance of turning brown as do apples, the process disclosed herein may be applied to other fruits as well, which have a density and porosity comparable to that of apples. By so slicing the apples or other fruit as disclosed herein to avoid a thickness of the slices exceeding about three-eighths of an inch, the ascorbic acid will be assured of penetrating a sufficient distance into the slices as to thoroughly preserve the fruit for freezing.

While the invention herein is particularly directed to the preserving of apples, since that is the one fruit which has caused the greatest amount of trouble in freezing processes, it is within the contemplation of the present invention that the process may be applied to other types of fruit wherein the problem may be present of the fruit being unable to absorb a sufficient amount of ascorbic acid to thoroughly preserve.

The ascorbic acid may, of course, be added in liquid form if so desired. This does not affect the penetration thereof, it having been determined that the critical thickness of the slices of apple is still necessary for effectual preservation.

It will be evident that changes may be made in the process with regard to the steps and specific amount and thickness of the slices from those disclosed herein without in any way departing from the spirit of the invention or sacrificing any of the attendant advantages hereof, provided, however, that such changes fall within the scope of the claims appended hereto.

Having thus described my invention what I claim as new and desire to secure by Letters Patent of the United States is:

1. The process of preserving apples which consists of the steps of slicing the apples into slices, each having a maximum thickness of about three-eighths of an inch, mixing the apples thus sliced with an amount of ascorbic acid sufficient to penetrate said slices and prevent browning thereof upon thawing, and then freezing the mixture.

2. The process of preserving apples which consists of freezing a mixture of ascorbic acid and sliced apples, wherein the thickness of each apple slice is greater than about one-sixteenth of an inch, but does not exceed about three-eighths of an inch.

3. The process of preserving apples which consists of the steps of cutting the apples into segments, slicing each segment transversely so that the thickness of each slice will not exceed about three-eighths of an inch, adding ascorbic acid to the apples thus sliced, and then freezing the apples and acid.

4. A frozen apple product normally subject to browning when thawed which comprises a mixture of apple slices having a maximum thickness of about three-eighths of an inch and an amount of ascorbic acid sufficient to penetrate each of said slices and prevent browning thereof upon thawing.

LLOYD J. HARRISS.

REFERENCES CITED

The following references are of record in the file of this patent:

Bauerfein et al.: Fruit Products Journal and American Food Manufacture, Sept. 1946 issue, Vol. 26. Article entitled "Methods of Freezing Sliced Apples with l-Ascorbic Acid."

Processing Frozen Peaches and Apricots with l-Ascorbic Acid. May 14, 1945. Distributed by Vitamin Div., Hoffmann La Roche Inc., Nutley 10, N. J.

Processing Frozen Fruit with l-Ascorbic. Revised Edition Feb. 1, 1946. Distributed by Hoffmann La Roche Inc., Vitamin Div., Nutley 10, N. J.